(12) United States Patent
Brucker et al.

(10) Patent No.: US 9,636,833 B1
(45) Date of Patent: May 2, 2017

(54) BAGEL DOUGH REMOVAL TONGS AND METHOD OF USE

(71) Applicant: Independent Ink, Inc., Gardena, CA (US)

(72) Inventors: Barry Brucker, Beverly Hills, CA (US); Rita M. Brucker, Beverly Hills, CA (US); Nadeepuram K. Ranganathan, Irvine, CA (US)

(73) Assignee: Independent Ink, Inc., Gardena, CA (US)

( * ) Notice: Subject to any disclaimer, the term of this patent is extended or adjusted under 35 U.S.C. 154(b) by 0 days.

(21) Appl. No.: 15/256,664

(22) Filed: Sep. 5, 2016

(51) Int. Cl.
  *B25B 7/00* (2006.01)
  *B25B 9/00* (2006.01)
  *B26D 3/28* (2006.01)
  *A21C 15/00* (2006.01)

(52) U.S. Cl.
  CPC .............. *B26D 3/283* (2013.01); *A21C 15/00* (2013.01)

(58) Field of Classification Search
  CPC ... A47G 21/10; B65G 7/12; B25J 7/00; B25B 9/02; A47J 43/283; B26D 3/283; A21C 15/00
  USPC ............................ 294/16, 99.1–99.2; D7/393
  See application file for complete search history.

(56) References Cited

U.S. PATENT DOCUMENTS

| | | | |
|---|---|---|---|
| 3,121,951 A | 12/1960 | Green | |
| 3,137,880 A * | 6/1964 | Kubit | ...................... B05C 17/00 15/210.1 |
| 4,979,419 A | 12/1990 | Sonkin | |
| 5,033,193 A | 7/1991 | Valenti | |
| 5,557,998 A | 9/1996 | Schwartz et al. | |
| 5,799,401 A | 9/1998 | Gering | |
| 5,920,991 A | 7/1999 | Tracy | |
| 6,129,398 A * | 10/2000 | Calhoun | ................... B25B 9/02 294/25 |
| D459,954 S * | 7/2002 | Wang | .............................. D7/686 |
| 6,494,517 B1 * | 12/2002 | Durant | ................... A47G 21/10 294/33 |
| D507,724 S * | 7/2005 | Bertulis | ........................ D7/686 |
| 7,458,163 B2 | 12/2008 | Teich et al. | |
| 2015/0052760 A1 | 2/2015 | Keschner | |

* cited by examiner

Primary Examiner — Stephen Vu
(74) *Attorney, Agent, or Firm* — Lodestone Legal Group; Jeromye V. Sartain

(57) ABSTRACT

Bagel dough removal tongs for removing bagel dough from a substantially half-toroid-shaped bagel half, the tongs comprising: a first tong member having a first leg terminating distally in a first end; a second tong member having a second leg terminating distally in a second end, the first and second legs being joined at a proximal hinge opposite the distal first and second ends, the hinge being configured to bias the first and second legs outwardly in an at rest configuration of the tongs wherein the first and second ends are spaced apart and to selectively allow flexing of the first and second legs inwardly in an operative configuration of the tongs wherein the first and second ends are shifted closer together.

18 Claims, 10 Drawing Sheets

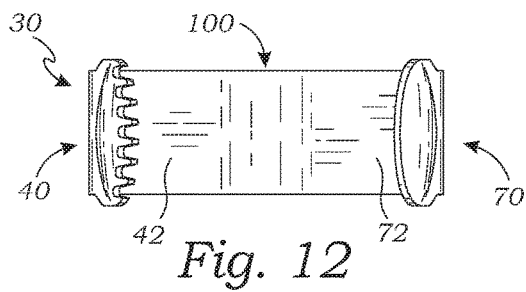
Fig. 12
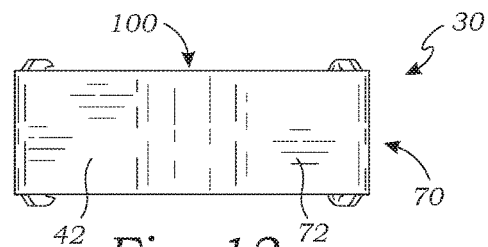
Fig. 13
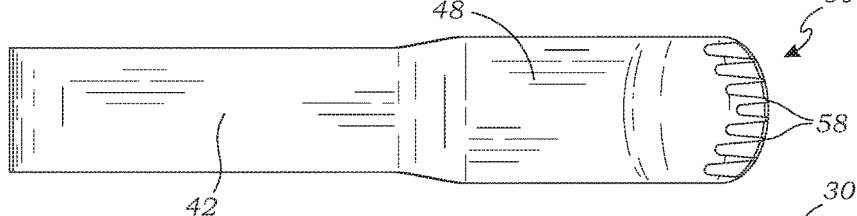
Fig. 14
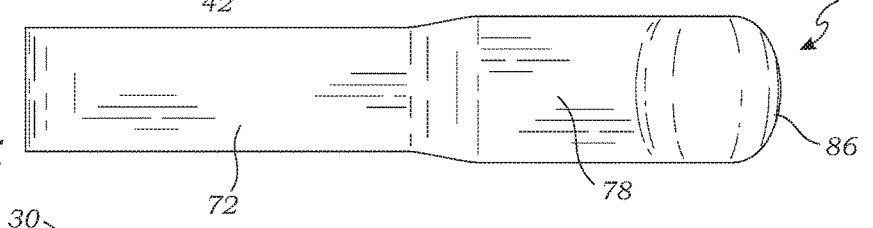
Fig. 15
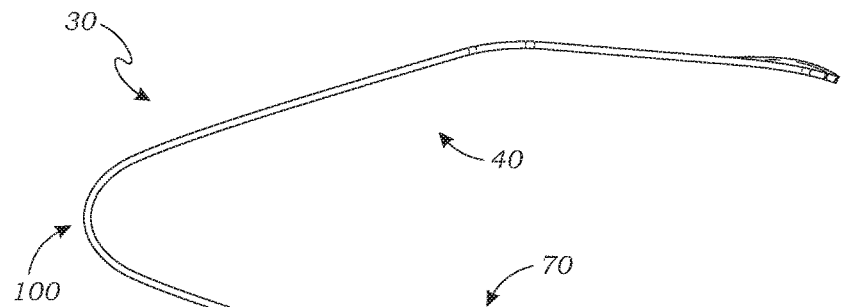
Fig. 16
Fig. 17

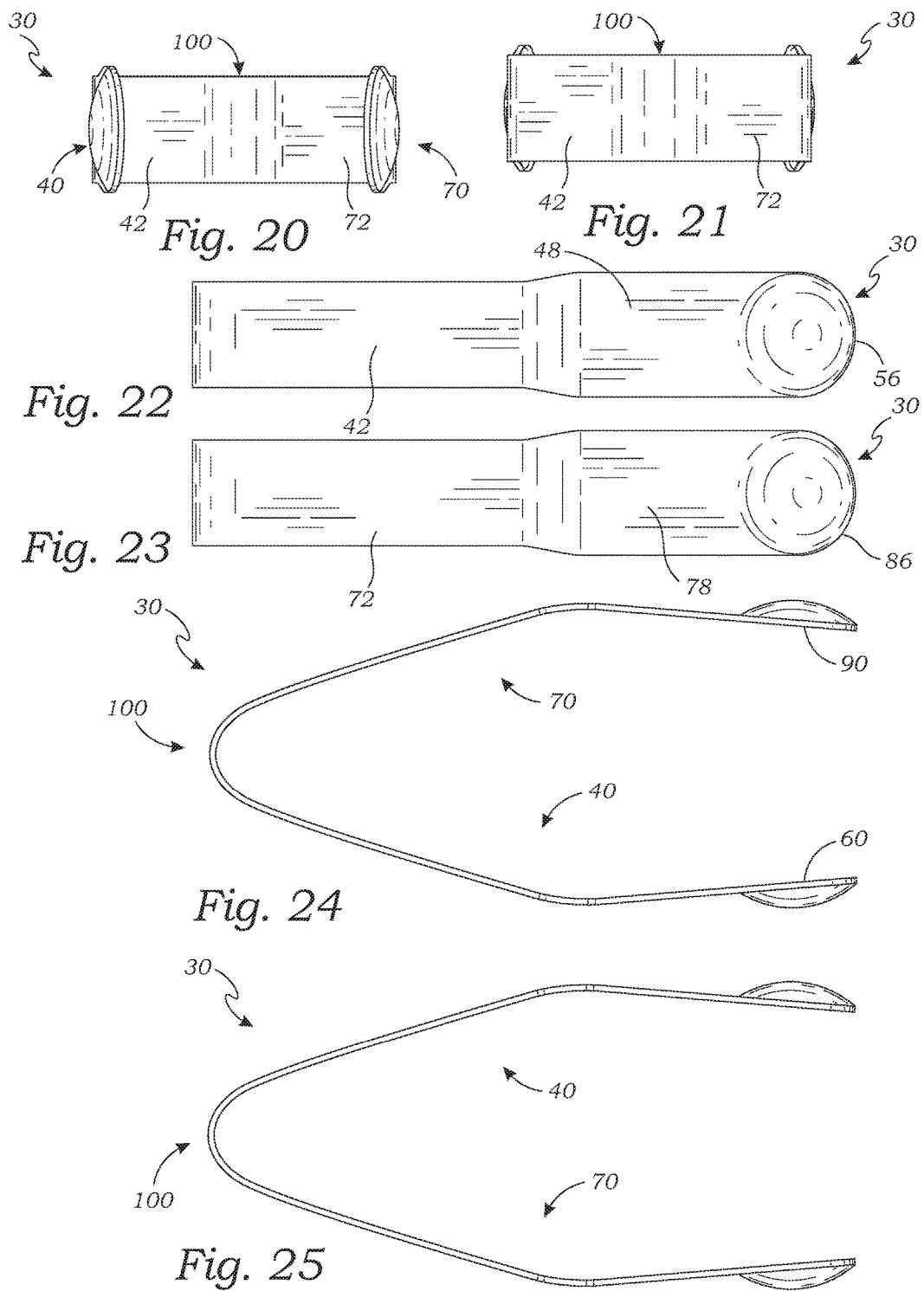

BAGEL DOUGH REMOVAL TONGS AND METHOD OF USE

BACKGROUND

The subject of this patent application relates generally to food preparation utensils, and more particularly to tongs configured for removing dough from the inner portion of a bagel.

Applicants hereby incorporate herein by reference any and all patents and published patent applications cited or referred to in this application.

By way of background, it is often desirable to remove the soft, doughy interior portion from a bread product such as a bagel so as to reduce the attendant calories and carbohydrates while preserving what many consider the more delicious outer crust, which can still be eaten and can serve as a support or carrier for other nourishing food items. Over the years many implements have been proposed for removal of the interior dough of a bread-type product. In the case of bagels, specifically, the typically round, toroidal shape presents challenges for dough removal, even when the bagel is sliced or bisected transversely so as to expose the interior dough of what is then a half-toroid-shaped bagel half. Related considerations are to remove the dough in an effective and sanitary manner without damaging the bagel crust or risking injury to the operator. Ideally, such a bagel dough removal device would be relatively simple and inexpensive. The following are representative examples of prior art devices for bagel scooping, coring or the like, each of which having shortcomings addressed by the present invention.

U.S. Pat. No. 4,979,419 to Sonkin is directed to an apparatus and method for treating baked goods, such as bagels. An outer ring including downwardly projecting pins is secured to the cut surface of a previously sliced bagel half. A cutting disc having an upwardly projecting handle and downwardly projecting cutting blades is rotatable within the outer ring, which outer ring serves as a guide and as a bearing. By turning the cutting disc while maintaining the bagel and the outer ring stationary, a circular trough will be cut in the dough of the bagel half by the cutting blades. In an automatic version of the apparatus, a flat, upwardly projecting screw is mounted in a base plate and a bagel half is secured by base plate mounted pins about the flat screw. A cutting disc is provided with a slot to receive the flat screw in a manner to automatically rotate the cutting disc relative to the bagel when the cutting disc is axially moved toward the base plate.

U.S. Pat. No. 5,033,193 to Valenti is directed to a scooper for a circular piece of bread-like material including a holder having a substantially circular base, a wall extending vertically upwardly from the perimeter of said base, and a gripper mounted on said base; the holder is adapted to receive the material, thereby preventing it from rotating. A rotor having a substantially circular bottom with a periphery fitting within the base and adapted for rotation with respect thereto is provided. A cutter having a blade is located on the bottom and extends therebelow, so that said blade is at the leading edge of said cutter as the rotor turns. The blade is arcuate, whereby rotation of said rotor causes the blade to cut into the piece and remove a portion thereof.

U.S. Pat. No. 5,557,998 to Schwartz is directed to a coring apparatus for coring a substantially annular food item including a base member, a post member extending from the base member, the post member including a drive shaft guide structure, a drive shaft having a longitudinal axis and being rotatably fitted through the guide structure, the drive shaft having shaft external threads, a mechanism for engaging the shaft external threads, so that rotating the drive shaft relative to the post member causes the drive shaft to advance along the longitudinal axis relative to the post member, a food item cutting element mounted on the drive shaft including arched blades having blade cutting edges radially spaced from the drive shaft longitudinal axis for cutting along a circular path, and a food item holding structure connected to the mounting base and located within the longitudinal axis of the drive shaft and adjacent to the cutting element for securing the food item against rotation relative to the post member so that the cutting element is advanced toward the holding structure and into contact with the food item by rotating the drive shaft in one direction.

U.S. Pat. No. 5,799,401 to Gering is directed to a bagel dough extractor wherein an annular base carries a moveable cam member. Downwardly extending circumferentially arranged arcuate blades are mounted along the outer edge of the base to form a circle. Downwardly extending circumferentially arranged arcuate blades are pivotally mounted along the inner edge of the base to form a circle within the circle of fixed blades. Springs are interposed between radially aligned pairs of blades. The apparatus is positioned over the bagel such that the blades enter the interior of the bagel. The cam member cooperates with the moveable blades to move each blade in a substantially radial direction, against the intervening spring. The blades move from a position spaced from the aligned fixed blade to a position proximate to the aligned blade, as the cam member is moved, causing the dough to be pinched between the aligned blades. The dough is extracted as the apparatus is removed from the bagel.

U.S. Pat. No. 5,920,991 to Tracy is directed to a device for removing dough from a piece of baked goods such as a bagel including a handle and a blade having a cutting edge secured to the handle. The blade is contoured to define an open region between the blade and the handle so that dough removed from the piece of baked goods can pass through the open region between the blade and the handle.

U.S. Pat. No. 7,458,163 to Teich is directed to a bagel scoop configured to remove excess dough from a piece of baked goods, such as a bagel. The bagel scoop includes a handle, and a concave, preferably shallow elliptical spoon-shaped closed combined blade and scoop structure, having a downward curvature, to enable scooping and removal of dough. The outer distal end of the combined blade and scoop structure is preferably serrated, to allow for scraping and scooping of the bagel core dough at a leading edge of the blade. The combined blade and scoop structure is attached to a stem, which, in turn, is attached to the handle. A small auxiliary scraper is provided at an opposite end, for fine scraping and removing of excess dough residue not taken by the shallow elliptical spoon-shaped closed combined blade and scoop structure.

U.S. Patent Application Publication No. 20150052760 to Keschner is directed to a device for removing material from exposed areas of a food item, such as a bagel, and comprises an elongated handle coupled to one end of a stem portion, the other end of the stem portion being coupled to a member having an array of three prongs extending therefrom. Each prong comprises an elongated member having rounded edges, the total width of the prong array being slightly less than the width of a typical sliced bagel thus preventing the circumference of the bagel from being cut during the scooping process.

As will be appreciated, the Sonkin (1990), Valenti (1991), and Schwartz (1996) devices are thus generally directed to a base or guide component that is to be selectively secured relative to a bagel half and a rotating component that is selectively positioned relative to the base or guide component. The rotating component is then formed with one or more blades configured to enter and engage the exposed interior dough of the bagel half when the rotating component is mated with the base or guide component, the rotating component being further formed with a handle or other mechanism for grasping or otherwise causing the rotating component to rotate axially relative to the base or guide and thus the bagel half secured thereon so as to cause the one or more blades to cut or separate the dough from the half bagel crust. Each such device is relatively complex and ineffective in use as well as being relatively costly due to the number and kinds of parts included in the assemblies.

The Gering (1998) "bagel dough extractor" device was proposed as an alleged improvement over the Sonkin, Valenti, and Schwartz devices (U.S. Pat. No. 5,799,401 at col. 1, line 19-col. 2, line 7) but suffers from its own shortcomings as also being relatively complex and ineffective in use as well as being relatively costly due to the number and kinds of parts included. Indeed, the Gering device appears to have more components and be more complex than the other proposed rotary devices of which Gering was critical. Moreover, the Gering device, as best illustrated in FIGS. 3 and 4 of the '401 patent, is configured in such a way as to leave quite a large portion of the dough within the bagel crust, rendering it less effective in use. Relatedly, the required operation of simultaneously keeping the device pushed down into the bagel half and preventing movement thereof, though not pushing the device too far down so as to cut through or damage the bagel crust, while pulling up on the handle 20 to actuate the ring of interior pivoted blades 26 so as to cut and pinch the bagel dough is thought to be cumbersome and difficult. As such, an improved and more simple and effective means for removal of the interior dough of a bagel or other such bread product was still needed.

Tracy (1999), Teich (2008), and Keschner (2015) then proposed relatively more simplified hand-held bagel dough removal utensils—scrapers and scoopers—each of which suffering from further deficiencies in construction and use even if providing some benefit in terms of being less complex or expensive relative to the above-noted prior art devices. First, the Tracy device comprises essentially a handle or body portion 15 with a somewhat downwardly projecting blade 14 configured to cut through or shave off excess bagel dough as by having an opening through which the separated dough can pass as the device is pulled through the bagel half, as best illustrated in FIG. 3 of U.S. Pat. No. 5,920,991. Teich was critical of this aspect of the Tracy device, stating that disadvantageously "Tracy is not capable of scooping and removing cut dough [and so] requires the additional step of manually removing the pieces of cut dough from the bagel, which defeats the purpose of providing a tool for cutting excess dough from the interior of a sliced bread product, such as a bagel" (U.S. Pat. No. 7,458,163 at col. 2, line 58-col. 3, line 4). Teich then proposed "a hand held bagel scooper for both scooping and removing excess dough from the inside of a bread product, such as a sliced bagel" ('163 at col. 4, lines 3-6), in the form of spoon-like device 1 having a particularly curved handle 2 and head or scoop structure 3 expressly having no point of inflection or change in curvature from concave to convex, thought to make the scoop device more effective and comfortable in use. However, while both scooping and removal of bagel dough are asserted as the improved functionality of the Teich device, it will be appreciated that with a single head or operative surface of whatever configuration, such removal is limited, particularly in view of the shape and relative shallowness of the Teich head or scoop structure 3 as best seen in FIG. 2 of the '163 patent. Moreover, while Teich also is concerned with the sanitary removal of dough and thus not requiring use of the fingers ('163 at col. 1, lines 23-26), as best appreciated from FIG. 3 of the '163 patent, it is most likely that in operation the thumb of the user will disadvantageously be used to trap the cut dough against the head or scoop structure 3 of the device in order to facilitate removal. Most recently, then, Keschner was expressly critical of the Teich device as creating a safety hazard due to the serrated teeth on the scoop and as generally being ineffectively configured (U.S. Pat. App. Pub. No. 20150052760 at paras. 0005 and 0006), instead proposing a scooper device 10 having a handle 12 with a prong member 16 at its working end having a somewhat downwardly-projecting array of prongs 20, 22, 24 terminating in rounded scooper edges 26, 28, 30 thought to be "safer and more efficient than prior art bagel scoopers" ('760 at paras. 0007 and 0013). However, while having rounded rather than serrated edges, the effectiveness of which is questioned for cutting through and tearing away bagel dough from the crust, like Teich, Keschner proposed effectively a single-sided scoop, here having three separate scooping surfaces in effectively the same plane, as best seen in FIG. 1 of the '760 publication, thus actually creating a relatively smaller surface for purpose of trapping and removing dough and again potentially requiring the use of an operator's finger or thumb to pin the dough against the scooping surfaces or prong member 16 for removal. Accordingly, there remains a need for an improved and more simple and effective means for removal of the interior dough of a bagel or other such bread product.

Aspects of the present invention fulfill these needs and provide further related advantages as described in the following summary.

SUMMARY

Aspects of the present invention teach certain benefits in construction and use which give rise to the exemplary advantages described below.

The present invention solves the problems described above by providing a bagel dough removal tongs. In at least one embodiment, bagel dough removal tongs are provided for removing bagel dough from a substantially half-toroid-shaped bagel half having a crust with an outer perimeter and a central core and further having a nominal bagel width radially spanning the distance across the crust from the perimeter to the core, a nominal bagel height vertically within the bagel dough as half the bagel width, and a nominal bagel chord across the bagel dough within the crust offset from the core and substantially transverse to the bagel width, the tongs comprising: a first tong member having a first leg terminating distally in a first end; a second tong member having a second leg terminating distally in a second end, the first and second legs being joined at a proximal hinge opposite the distal first and second ends, the hinge being configured to bias the first and second legs outwardly in an at rest configuration of the tongs wherein the first and second ends are spaced apart and to selectively allow flexing of the first and second legs inwardly in an operative configuration of the tongs wherein the first and second ends are shifted closer together; further wherein: a first end width and a second end width of the respective first and second ends are in the range of one to two-and-a-half inches for substantially conforming to the nominal bagel width, the bagel dough to be removed being located within the crust between the perimeter and the core; and a transverse opening of the tongs in the at rest configuration between first and second leading edges of the respective first and second ends is in the range of one-and-a-half to four-and-a-half inches for substantially conforming to and being interiorly offset from the nominal bagel chord, whereby selectively positioning the tongs while substantially in the at rest configuration such that the first and second ends are adjacent to the crust so as to not span the core therebetween and so positioned substantially along a selected nominal bagel chord and such that the first and second leading edges are pushed into the bagel dough without penetrating the crust and then selectively squeezing inwardly on the first and second tong members so as to shift the first and second legs and first and second ends inwardly toward each other substantially in the operative configuration causes a portion of the bagel dough to be trapped between the first and second ends, such that subsequently pulling the tongs away from the bagel half while still in the operative configuration removes the portion of bagel dough therefrom.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings:

FIG. 12 is a bottom view thereof, in accordance with at least one embodiment;

FIG. 13 is a top view thereof, in accordance with at least one embodiment;

FIG. 14 is a left side view thereof, in accordance with at least one embodiment;

FIG. 15 is a right side view thereof, in accordance with at least one embodiment;

FIG. 16 is a front view thereof, in accordance with at least one embodiment;

FIG. 17 is a back view thereof, in accordance with at least one embodiment;

FIG. 20 is a bottom view thereof, in accordance with at least one embodiment;

FIG. 21 is a top view thereof, in accordance with at least one embodiment;

FIG. 22 is a left side view thereof, in accordance with at least one embodiment;

FIG. 23 is a right side view thereof, in accordance with at least one embodiment;

FIG. 24 is a front view thereof, in accordance with at least one embodiment;

FIG. 25 is a back view thereof, in accordance with at least one embodiment.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments. More generally, those skilled in the art will appreciate that the drawings are schematic in nature and are not to be taken literally or to scale in terms of material configurations, sizes, thicknesses, and other attributes of an apparatus according to aspects of the present invention and its components or features unless specifically set forth herein.

DETAILED DESCRIPTION

Figure 1:
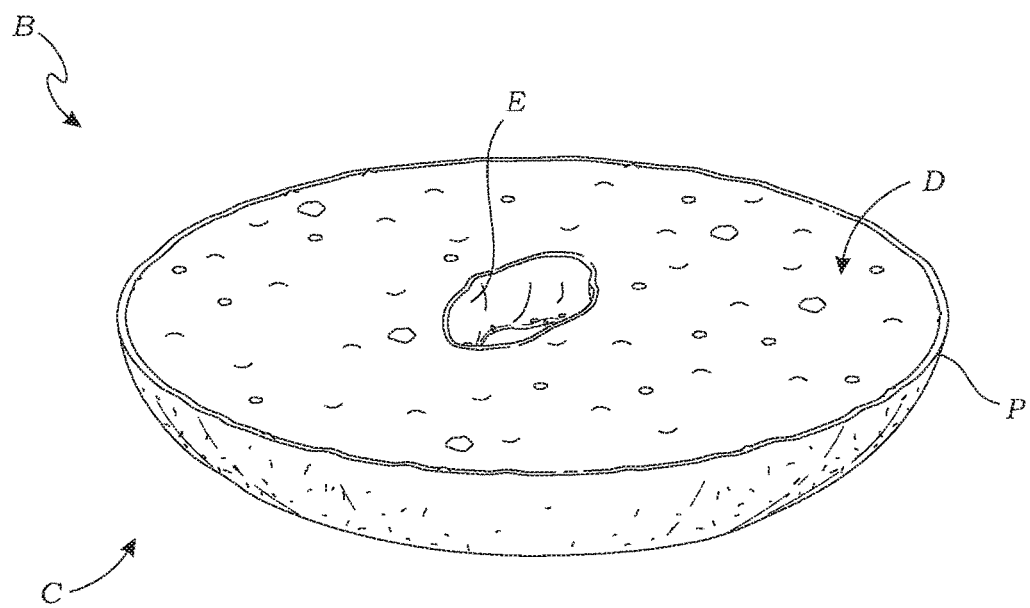
FIG. 1 (Prior Art) is a perspective view of an exemplary sliced bagel half.
Figure 2:
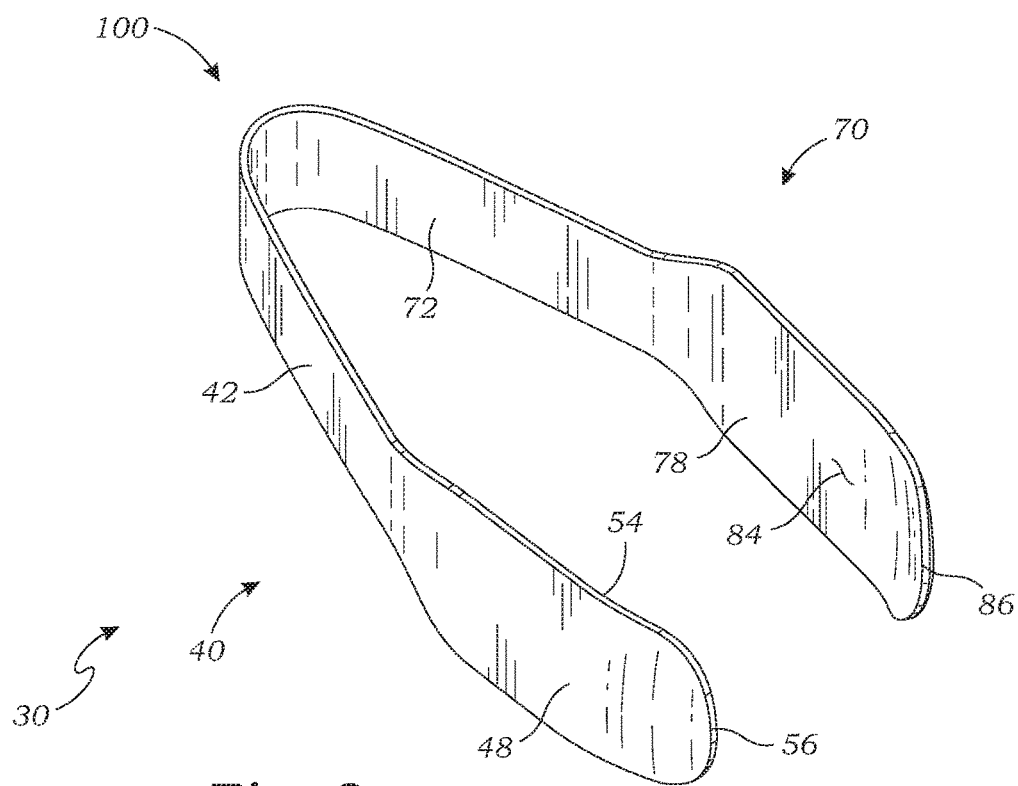
FIG. 2 is a perspective view of an exemplary bagel dough removal tongs, in accordance with at least one embodiment.
Figure 3:
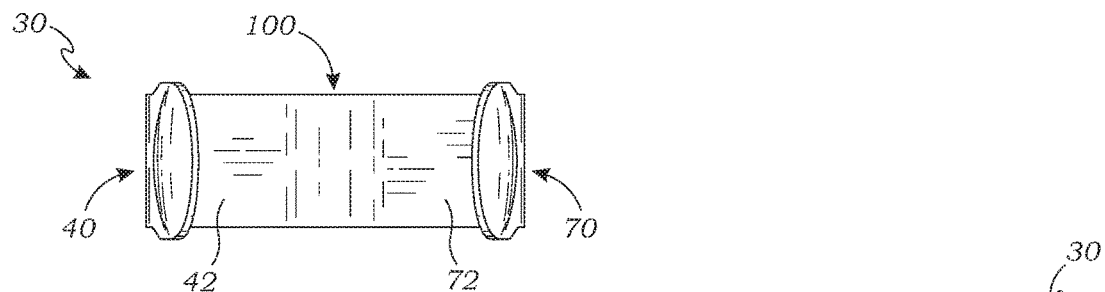
FIG. 3 is a bottom view thereof, in accordance with at least one embodiment.
Figure 4:
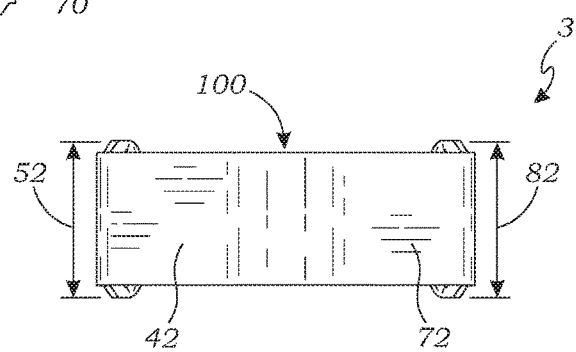
FIG. 4 is a top view thereof, in accordance with at least one embodiment.
Figure 5:
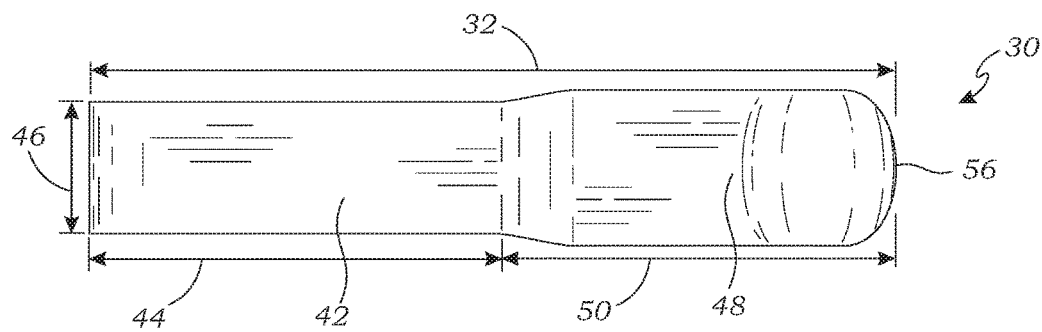
FIG. 5 is a left side view thereof, in accordance with at least one embodiment.
Figure 6:
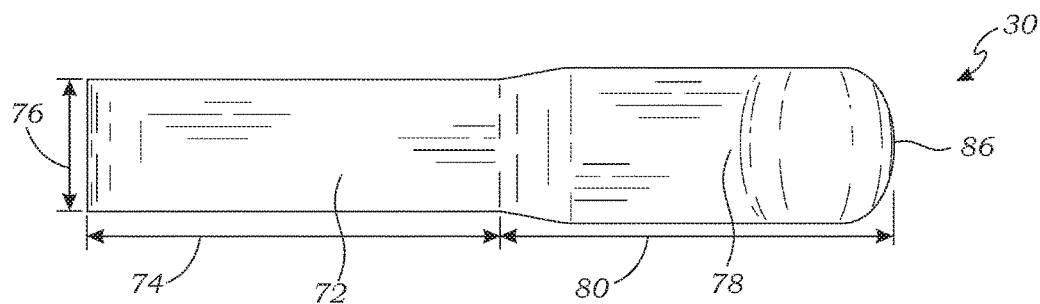
FIG. 6 is a right side view thereof, in accordance with at least one embodiment.
Figure 7:
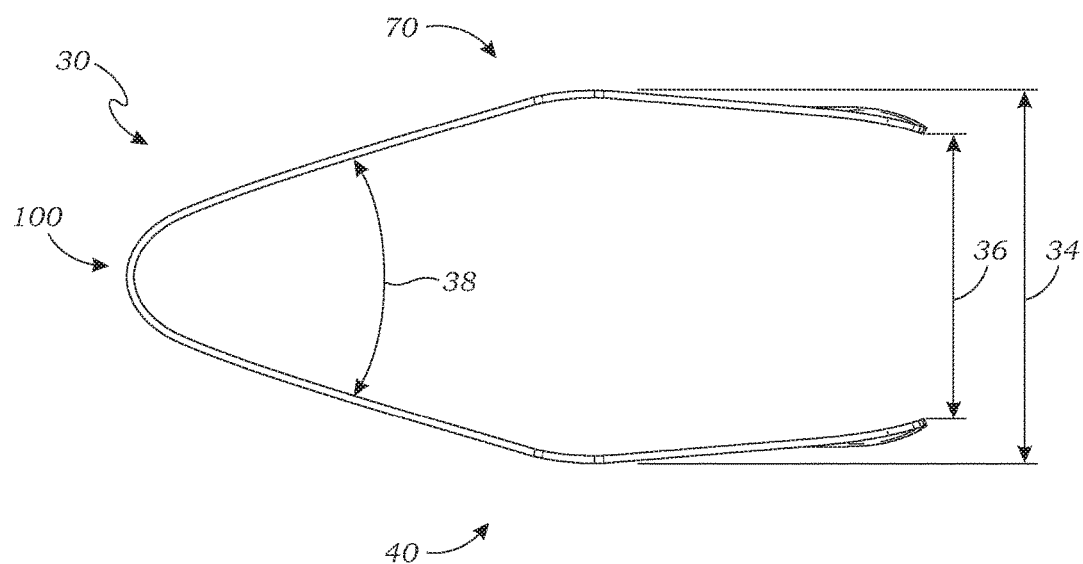
FIG. 7 is a front view thereof, in accordance with at least one embodiment.
Figure 8:
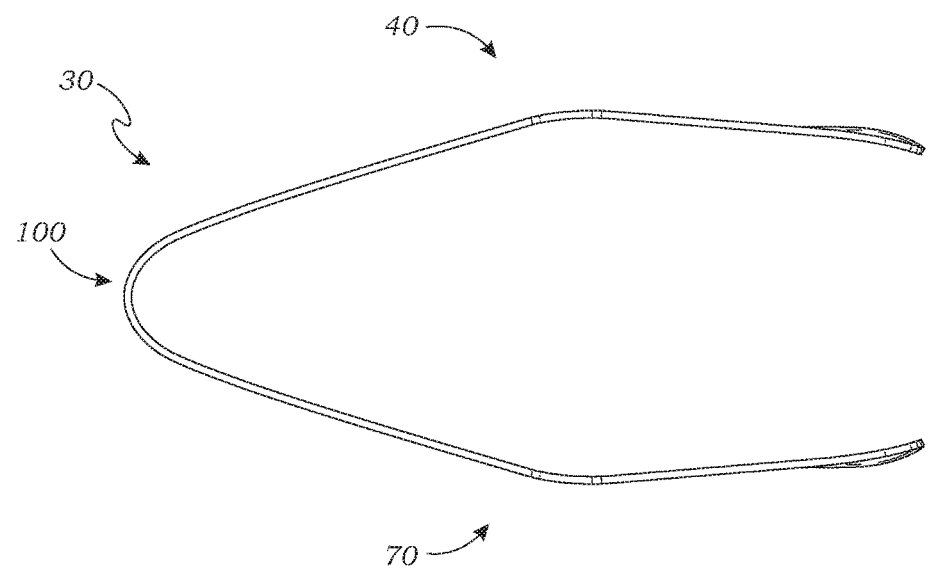
FIG. 8 is a back view thereof, in accordance with at least one embodiment.
Figure 10:
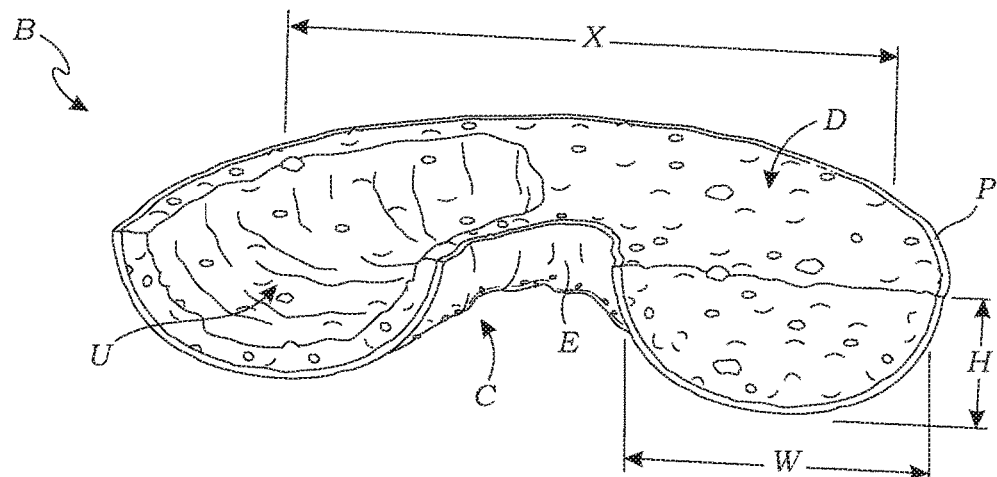
FIG. 10 is a cross-sectional perspective view of the bagel half of FIG. 9, in accordance with at least one embodiment.
Figure 11:
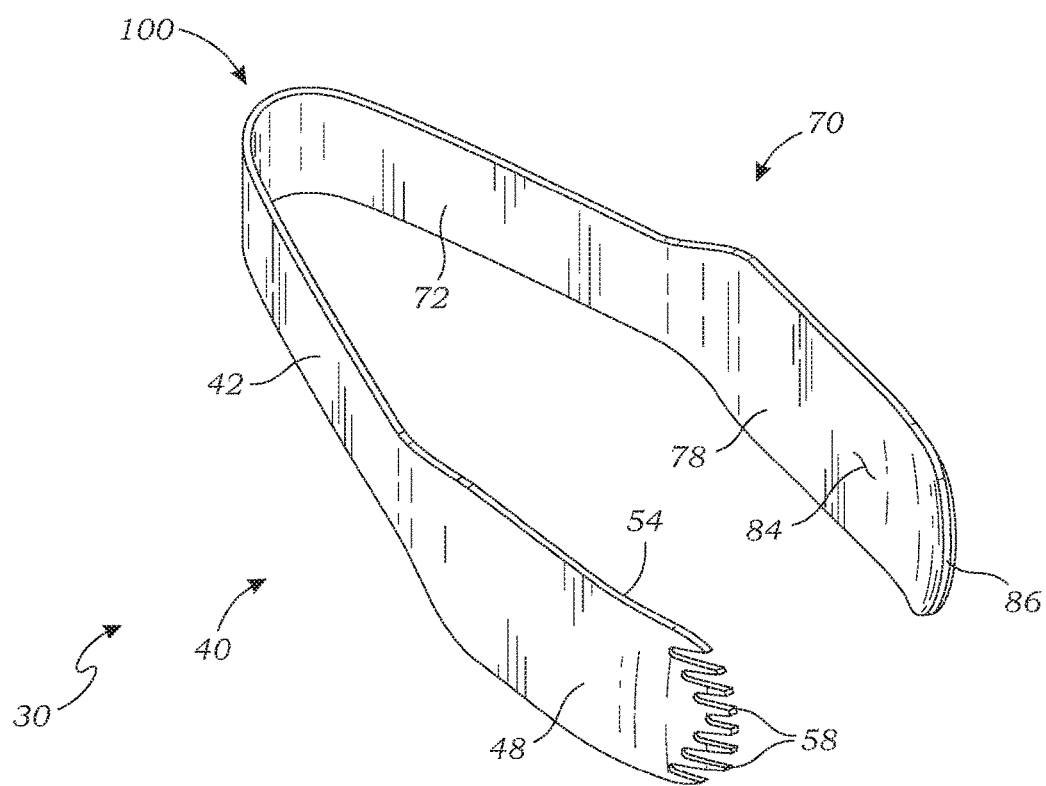
FIG. 11 is a perspective view of an alternative exemplary bagel dough removal tongs, in accordance with at least one embodiment.

Turning first to FIG. 1, there is shown a perspective view of a typical sliced bagel half B. As a threshold matter, it will be appreciated that any bread-like product having an outer portion or crust and a doughy interior may be the context for the present invention, such that the exemplary bagel half B is to be understood as merely illustrative. As shown, the typical bagel half B is a somewhat round, half-toroid-shaped bread product that comprises an outer crust C surrounding interior dough D that is rendered visible and accessible when a whole bagel is sliced or bisected transversely to produce a bagel half B substantially as illustrated. The crust C defines an outer profile or perimeter P and a substantially central core E. As best seen in FIG. 10, the widest radial distance across the bagel dough D between the crust outer perimeter P and the central core E, essentially in the bisection plane along which the whole bagel was cut to form the bagel half B, defines a nominal bagel width W, and the thickest part of the dough D, which is essentially the vertical depth at a point substantially midway along the width W, defines a nominal bagel height H, which it will be appreciated is thus about half of the width W. Being a half-toroid, the bagel half B has a crust C that in profile or cross-section forms an arcuate or curved shape that is upwardly-opening when the bagel half B is positioned face-up as shown in FIGS. 1 and 10, the crust curvature having a nominal radius that is effectively equal to the height H, though not necessarily, which radius and height H it will thus again be appreciated is about half of the width W. Typical whole bagels have nominal overall outside dimensions of about four to six inches (4-6 in.) in diameter and one to three inches (1-3 in.) in thickness with an approximately half inch to one-and-a-half inch (0.5-1.5 in.) diameter central hole. Assuming a negligible crust thickness for these purposes, it would follow that for the half bagel B the nominal bagel width W would be approximately one inch to three inches (1-3 in.) and the nominal bagel height H and thus radius of the crust C would be about a half inch to one-and-a-half inch (0.5-1.5 in.), or again half the bagel width W. Those skilled in the art will appreciate that the foregoing assumes a uniform and symmetrical toroidally-shaped bagel, including a round or circular perimeter and center hole. On that basis, the round profile or perimeter P of the half bagel B defines not only a diameter through its geometric center but other transverse bagel chords X, or lines that intersect two opposite points on the circular perimeter not passing through the geometric center or thus being offset from and shorter than the nominal diameter and crossing or running transverse to the bagel width W and typically larger or defining a longer dimension than the width W. Those skilled in the art will thus appreciate that select ones of such bagel chords X define distances across the interior dough D without spanning or encompassing the bagel core E, such that, as will be appreciated from the below discussion, representative bagel chords X would entail or define a swath of dough D that may be grasped and removed in one operation while avoiding both the perimeter P and the core E of the crust C of the bagel half B. For exemplary bagel halves B in the range of about four to six inches (4-6 in.) in outside diameter and about a half inch to one-and-a-half inch (0.5-1.5 in.) in central hole diameter it would follow that the prescribed bagel chords X may be in the range of about two inches to five inches (2-5 in.). It will be appreciated, ultimately, that while certain exemplary dimensions for typical bagels are herein described, a wider range of bagel and other bread product dimensions and proportionality are possible, such that the exemplary sizes and configurations are to be understood as illustrative and non-limiting.

Turning next to FIGS. 2-8, there are shown perspective and orthogonal views of an exemplary embodiment of bagel dough removal tongs 30 according to aspects of the present invention. The tongs 30 generally comprise, in the exemplary embodiment, opposite first and second tong members 40, 70 interconnected proximally at a hinge 100. The first tong member 40 has a first leg 42 terminating distally in a first end 48, and the second tong member 70 has a second leg 72 terminating distally in a second end 78, the first and second legs 40, 70 being joined at the proximal hinge 100 opposite the distal first and second ends 48, 78. The hinge 100 is configured to bias the first and second legs 42, 72 outwardly in an at rest configuration of the tongs 30 as shown in FIGS. 2-8 wherein the first and second ends 48, 78 are spaced apart and to selectively allow flexing of the first and second legs 42, 72 inwardly in an operative configuration of the tongs 30 wherein the first and second ends 48, 78 are shifted closer together as when something is to be grasped between them. As a general observation, it will be appreciated that in the exemplary tongs 30 shown, the hinge 100 is a "living hinge" as being comprised of a flexible or resilient material. Moreover, as illustrated, the hinge 100 may be integral with the first and second tong members 40, 70, here as by molding, rolling, stamping, machining, or otherwise forming the tongs 30 from a unitary piece of material such as plastic or metal in any manner and employing any such material now known or later developed in the art. It will be appreciated that the advantage of such construction is simplicity and effectively having only one part; alternatively, for a number of reasons relating to form or function or preference, the tongs 30 may be formed from two or more parts that are later assembled. By way of illustration and not limitation, the hinge 100 portion may be formed of metal while the first and second tong members 40, 70 may be formed of plastic, as through an over-molding process directly onto the hinge 100 or as by being separately molded or otherwise formed and then installed on the metal hinge 100 as by fastening, bonding, or any other such technique now known or later developed. Or, by way of further illustration and not limitation, the working distal first and second ends 48, 78 may be made of metal using any appropriate process now known or later developed and the hinge 100 and first and second legs 42, 72 may of a unitary construction as by being over-molded directly onto the first and second ends 48, 78 or as by being separately molded or otherwise formed and then installed on the first and second ends 48, 78 as by fastening, bonding, or any other such technique now known or later developed. Again, those skilled in the art will appreciate that a variety of such configurations of the tongs 30 and their construction are possible according to aspects of the present invention without departing from its spirit and scope. Relatedly, while a "living" flexible hinge 100 is shown, it will be appreciated that a variety of other hinges or hinge configurations or members and related biasing members such as springs or other such components now known or later developed may be employed in tongs 30 according to aspects of the present invention. And whether the exemplary living hinge 100 is formed integrally with the first and second tong members 40, 70 or separate, it will be appreciated that if metal it may be formed as by a bending process from an originally flat piece of stock material that is stamped or machined into the desired flat shape or template before being bent or curved into the final configuration of the tongs 30, again using any appropriate process now known or later developed. If the hinge 100 is of plastic, it may be formed in the desired shape as molded and will have a natural flexibility or resiliency depending on the material selected and other factors.

Figure 9:
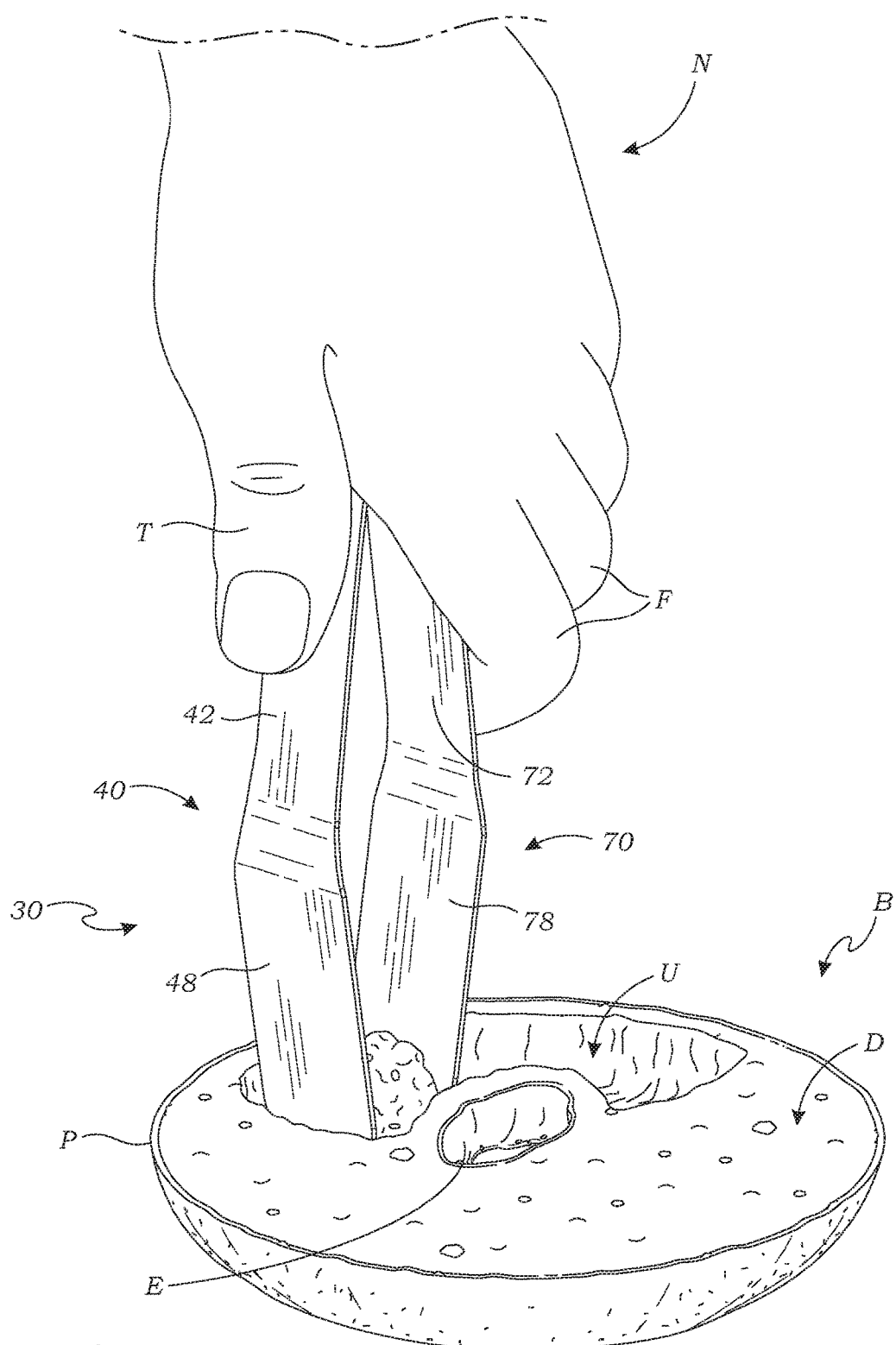
FIG. 9 is a perspective view thereof in use in connection with the bagel half of FIG. 1, in accordance with at least one embodiment.

With continued reference to FIGS. 2-8, the exemplary bagel dough removal tongs 30 may be sized and configured for optimal engagement with a bagel half B (FIG. 1) and removal of dough D therefrom as well as for comfortable and effective grasping in use. As noted above, for exemplary bagel halves B in the range of about four to six inches (4-6 in.) in outside diameter and about a half inch to one-and-a-half inch (0.5-1.5 in.) in thickness and central hole diameter, it would follow that the nominal dough width W is about one inch to three inches (1-3 in.), the nominal bagel height H and thus radius of the crust C would be about a half inch to one-and-a-half inch (0.5-1.5 in.), or again half the bagel width W, and the nominal bagel chords X may be about two inches to five inches (2-5 in.). It being desired to optimally remove dough D from a bagel half B with each operation of the tongs 30, particularly the working distal first and second ends 48, 78 are configured having profiles inset from and somewhat mirroring the dough D cross-section within the crust C and further having a range of motion that starts from a biased-apart relative location allowing for positioning the first and second ends 48, 78 so as to span or capture a swath of dough D that approximates a chord X length. Accordingly, a first end width 52 and a second end width 82 of the respective first and second ends 48, 78 are in the range of one to two-and-a-half inches (1-2.5 in.) for substantially conforming to the nominal bagel width W. Further, the distal first and second leading edges 56, 86 of the respective first and second ends 48, 78 are formed not only with a relatively sharp or hard corner for cutting or separating the dough D during use, but with a profile curvature again approximating that of the bagel crust C. It will thus be appreciated that such first and second ends 48, 78 may be positioned somewhat vertically to a depth within the dough D of a bagel half B for optimal removal of the dough D without contacting or at least penetrating or damaging the crust C while removing a net amount of dough D, thereby leaving a trough U in the bagel half B with a relatively small margin of remaining dough D on the inside of the crust C. Relatedly, a transverse opening 36 of the tongs 30 in the at rest configuration between the first and second ends 48, 78, and the first and second leading edges 56, 86 more particularly, is in the range of one-and-a-half to four-and-a-half inches (1.5-4.5 in.) for substantially conforming to and being interiorly offset from a nominal bagel chord X. Thus, selectively positioning the tongs 30 while substantially in the at rest configuration such that the first and second ends 48, 78 are offset from the core E so as to not span the core E therebetween, and so are positioned substantially along a selected nominal bagel chord X, and then pushing the first and second leading edges 56, 86 into the bagel dough D without penetrating the crust C and selectively squeezing inwardly on the first and second tong members 40, 70, whether at the first and second legs 42, 72 or the first and second ends 48, 78 or both, so as to shift the first and second legs 42, 72 and first and second ends 48, 78 inwardly toward each other into such an operative configuration causes a portion of the bagel dough D to be trapped between the first and second ends 48, 78, as shown in FIG. 9, such that subsequently pulling the tongs 30 away from the bagel half B while still in the operative configuration removes the trapped portion of bagel dough D therefrom. In the exemplary embodiment, the first and second end widths 52, 82 of the respective first and second ends 48, 78 are in the range of one to two-and-a-half inches (1-2.5 in.), more preferably in the range of one-and-a-quarter to two-and-a-quarter inches (1.25-2.25 in.) and most preferably in the range of one-and-a-half to two inches (1.5-2 in.), and the transverse opening 36 is in the range of one-and-a-half to four-and-a-half inches (1.5-4.5 in.), more preferably in the range of one-and-three-quarter to three-and-a-half inches (1.75-3.5 in.), and most preferably in the range of two to three inches (2-3 in.).

Regarding other dimensional features of the exemplary bagel dough removal tongs 30, it is shown with particular reference to FIGS. 5-9 that a first leg width 46 and a second leg width 76 of the respective first and second legs 42, 72 are narrower than the respective first and second end widths 52, 82 of the first and second tong members 40, 70, or may be in the range of one-half to two inches (0.5-2.0 in.), in the interest of comfort for the user and ergonomic considerations when grasping the tongs 30 in a single hand N between the thumb T and fingers F as illustrated in FIG. 9, though it will be appreciated that the leg widths 46, 76 and end widths 52, 82 may be the same or in some cases the leg widths 46, 76 may be great than the end widths 52, 82. Relatedly, the tongs 30 are shown as having an overall length 32 from essentially the apex of the hinge 100 to the apex or furthest tips of the first and second leading edges 56, 86 of the respective first and second ends 48, 78—in the exemplary embodiment such overall length 32 is in the range of about four to eight inches (4-8 in.). Moreover, in the exemplary embodiment, the stepped or tapered transition from the respective first and second legs 42, 72 to the respective first and second ends 48, 78 is approximately midway along the length of the respective first and second tong members 40, 70 or of the tongs 30 themselves—here, that translates to the first and second leg lengths 44, 74 and the first and second end lengths 50, 80 each being in the range of about two to four inches (2-4 in.). Referring to the front view of FIG. 7, it can be seen that in the exemplary embodiment of the tongs 30 the transition points between the respective first and second legs 42, 72 and the respective first and second ends 48, 78 define bends or knees wherein the first and second legs 42, 72 are angularly diverging and then the first and second ends 48, 78 are slightly angularly converging in the at rest configuration of the tongs 30, such that as shown the first and second ends 48, 78 and particularly the distal first and second leading edges 56, 86 are angled or oriented slightly inwardly to aid in operation and the bends or knees at the transition points between the respective first and second legs 42, 72 and the respective first and second ends 48, 78 thus define an overall width 34 or widest point of the tongs 30 that is slightly larger than the transverse opening 36 between the first and second ends 48, 78. Relatedly, the included angle 38 between the first and second legs 42, 72 is acute and will be a function of the relative lengths of the respective first and second legs 42, 72 and first and second ends 48, 78, but in the illustrated embodiment is in the range of about twenty-five to forty-five degrees (25-45°). It will be appreciated that such a geometrical arrangement provides not only for convenient and comfortable gripping but also effective operation, in that the included at rest angle 38 is manageable ergonomically while it and the widest transition point noted as correlating to the overall width 34 would provide a point of leverage or mechanical advantage in squeezing the opposing first and second tong members 40, 70 inwardly. Further, it will be appreciated that as a user grasps the tongs 30 lower or "chokes up" on them by moving his or her hand downwardly along the first and second tong members 40, 70, for example lower than shown in FIG. 9 such that the thumb T is positioned on the widest transition point between the first leg 42 and the first end 48, further leverage is attained for cutting through or grasping the bagel dough D in use. Those skilled in the art will again appreciate that all such dimensions and other exemplary configuration details are illustrative and non-limiting, such that other arrangements may be employed according to aspects of the present invention without departing from its spirit and scope. Moreover, while the first and second tong members 40, 70 are shown as being symmetrical or essentially identical, it will be appreciated that such is not required. Not only may one of the tong members 40, 70 be formed having features not found in the other, such as is the case in the second exemplary embodiment of FIGS. 11-18 discussed below where the leading edge 56 of one of the ends, here the first end 48, is formed having teeth 58, but it is always possible that the first and second ends 48, 78 may be formed with further distinct features from one another, even as to shape or size or as by combining features differently, such as having a more defined recess 60 as shown in the third exemplary embodiment of FIGS. 19-26 only in one end 48, 78 rather than both. Once more, those skilled in the art will appreciate that a variety of other combinations of features and configurations of bagel dough removal tongs 30 are possible according to aspects of the present invention, such that the various exemplary embodiments shown and described are to be understood as illustrative and non-limiting.

Figure 18:
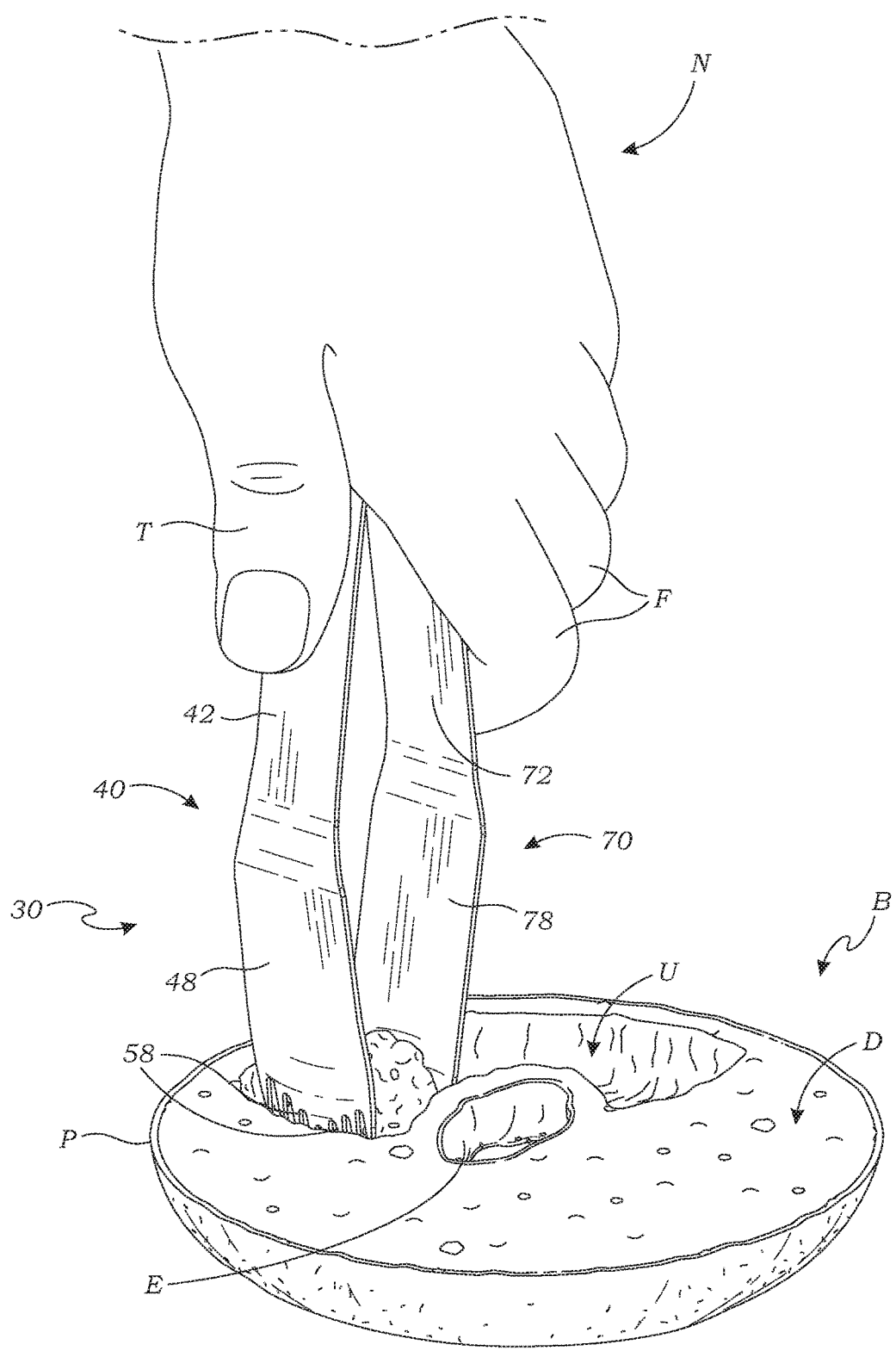
FIG. 18 is a perspective view thereof in use in connection with the bagel half of FIG. 1, in accordance with at least one embodiment.
Figure 19:
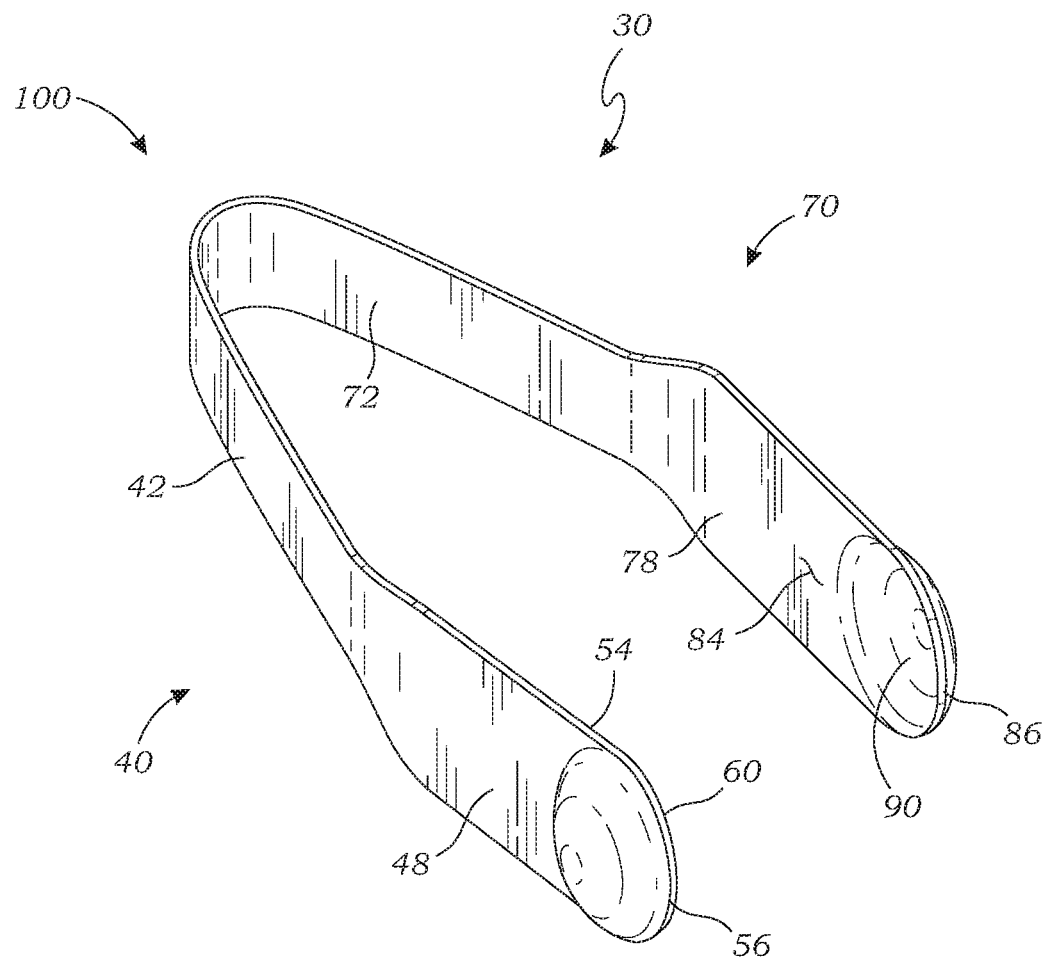
FIG. 19 is a perspective view of a further alternative exemplary bagel dough removal tongs, in accordance with at least one embodiment.

Referring next to FIGS. 11-18, there are shown perspective and orthogonal views of an alternative exemplary embodiment of bagel dough removal tongs 30 according to aspects of the present invention. Here, the tongs 30 again generally comprise opposite first and second tong members 40, 70 interconnected proximally at a hinge 100. The first tong member 40 has a first leg 42 terminating distally in a first end 48, and the second tong member 70 has a second leg 72 terminating distally in a second end 78, the first and second legs 40, 70 being joined at the proximal hinge 100 opposite the distal first and second ends 48, 78. Here, while the second end 78 once more terminates in a somewhat smooth, curved distal second leading edge 86, the first end 48 instead terminates in a series of somewhat parallel or axially-aligned, distally-projecting offset first teeth 58. It will be appreciated that such teeth 58 would assist in cutting through and tearing away dough D from the bagel crust C. As such, while a particular number and arrangement of teeth 58 are shown, it will be further appreciated that a variety of other edge configurations are possible, including teeth of other forms, serrations, and any other such surface or edge treatment now known or later developed for cutting through dough D or other such bread-type material. While only first teeth 58 are shown as formed on the leading edge 56 (FIG. 2) of the first end 48, such teeth may also be formed on the leading edge 86 of the second end 78. In either case, though particularly where only the first teeth 58 are formed on the first end 48 as illustrated, those skilled in the art will appreciate that rather than inserting the tongs 30 into the dough D vertically from above as shown in FIG. 18, the tongs 30 may be manipulated and oriented relative to the bagel half B more at an angle such that the first end 48, and particularly the leading edge 56 with teeth 58, enters the dough D initially somewhat parallel to the crust C so as to further facilitate cutting the dough D and separating it from the bagel half B as by scraping along the bottom of the trough U as the teeth 58 help separate the dough D from the lower part of the crust C. In that regard, it will be appreciated that, advantageously, once the dough D is separated, squeezing the first and second tong members 40, 70 together would bring the second end 78 down toward the first end 48 still positioned somewhat beneath a portion of the dough D so as to then clamp or grasp the sectioned dough D and remove it, again without having to use the fingers F to grasp the dough D at all.

Figure 26:
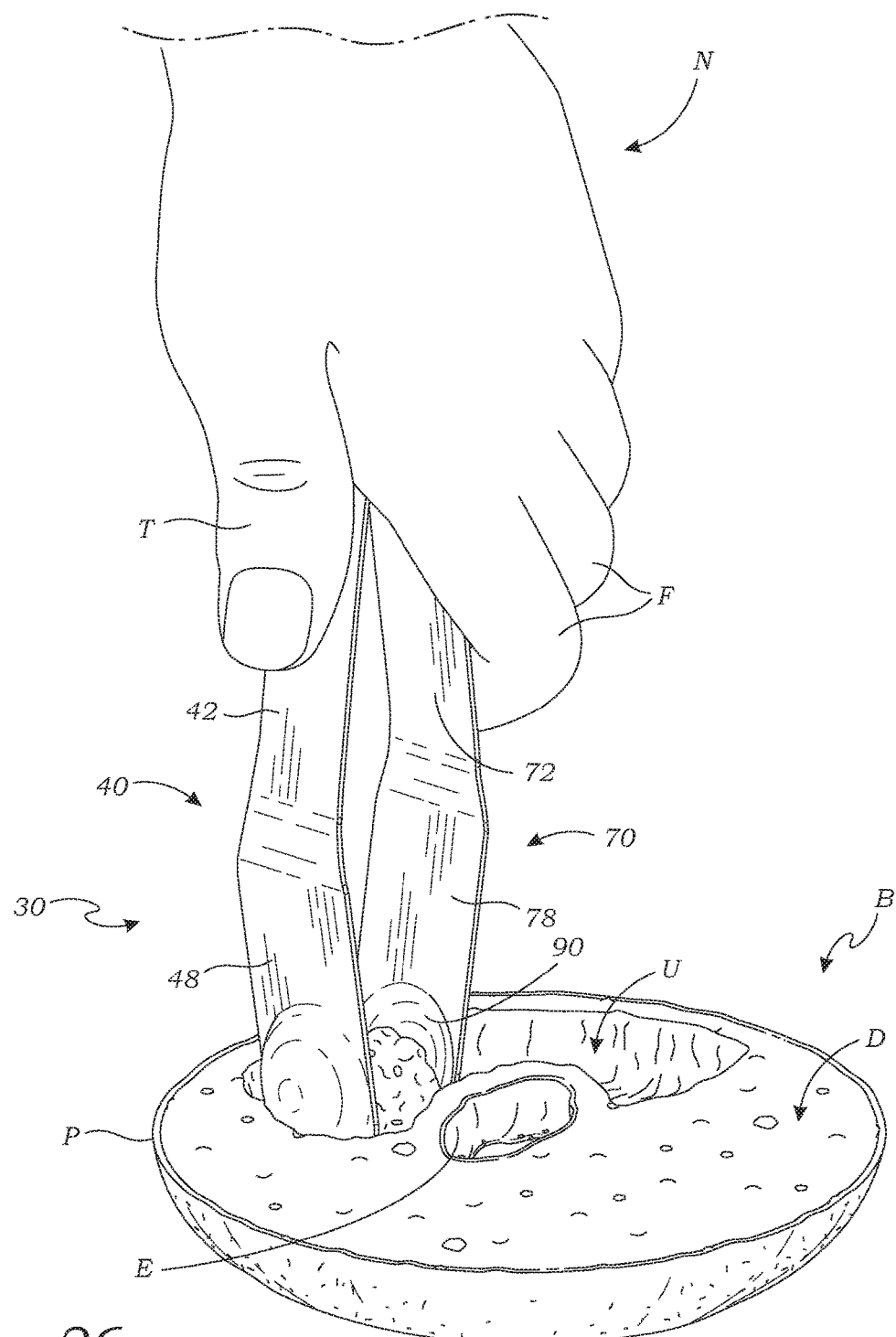
FIG. 26 is a perspective view thereof in use in connection with the bagel half of FIG. 1, in accordance with at least one embodiment.

Finally, referring to FIGS. 19-26, there are shown perspective and orthogonal views of a further alternative exemplary embodiment of bagel dough removal tongs 30 according to aspects of the present invention. Here, the tongs 30 again generally comprise opposite first and second tong members 40, 70 interconnected proximally at a hinge 100, with the first tong member 40 having a first leg 42 terminating distally in a first end 48 and the second tong member 70 having a second leg 72 terminating distally in a second end 78, the first and second legs 40, 70 being joined at the proximal hinge 100 opposite the distal first and second ends 48, 78. The first and second ends 48, 78 are now formed having opposite, inwardly-opening respective first and second recesses 60, 90, which may be solid or perforated. It will be appreciated that while all illustrated embodiments of the first and second ends 48, 78 have inwardly curved or concave respective inner first and second surfaces 54, 84 to facilitate grasping and retaining the bagel dough D, here, the inclusion of the relatively more pronounced first and second recesses 60, 90 would further facilitate retention of bagel dough D, and potentially in a relatively larger amount. Such recesses 60, 90 are shown as being positioned at or sharing a common edge with the respective first and second leading edges 56, 86, though it will be appreciated that they may be positioned elsewhere or slightly proximal of the leading edges 56, 86 as well. Relatedly, while the recesses 60, 90 are shown as being round or somewhat semispherical, it will also be appreciated that such recesses may be more elongate or take other shapes without departing from the spirit and scope of the invention. Furthermore, other frictional or other such grasping surfaces or surface features may be employed instead of or in addition to the illustrated recesses 60, 90. And as with the teeth 58 (FIGS. 11-18), while first and second recesses 60, 90 are shown on the respective first and second ends 48, 78, those skilled in the art will appreciate that such a recess may instead be formed on only one of the tong ends; for example, one side of the tongs 30 could be relatively flatter such as in the embodiments of FIGS. 1-18 and only the opposite side of the tongs 30 have a recess such as shown and described, which it will be appreciated would still facilitate trapping and removing dough D while the relatively flatter side could be used to cut, tear, or otherwise separate a portion of the dough D from the bagel half B, the two sides of the tongs 30 thus having particular features for particular purposes and cooperating to facilitate removal of dough D from the bagel half B. By way of further illustration and not limitation, one or both of the tong ends 48, 78 may still be formed having a sharp or toothed leading edge whether on the same or opposite side with or whether in conjunction with a recess 60, 90 or not, and whether any such recess 60, 90 is located right at the distal end or offset proximally therefrom. Once again, those skilled in the art will appreciate that a variety of such combinations of features are possible according to aspects of the present invention without departing from its spirit and scope. And regardless of whether there are two opposed recesses 60, 90 or one and whether the tongs 30 are inserted into the dough D vertically from above as shown in FIG. 26 or at some other angle or orientation, at entry and/or during squeezing, the tongs 30 may be manipulated relative to the bagel half B to grasp and remove the dough D as by squeezing the first and second tong members 40, 70 together to trap any dough D between the respective first and second ends 48, 78 and thus allow for its removal, again without having to use the fingers F to grasp the dough D at all.

Turning again to FIGS. 9, 10, 18 and 26, in use of a bagel dough removal tongs 30 according to aspects of the present invention, a round, half-toroid-shaped bagel half B that has previously been transversely sectioned or cut from a whole bagel (not shown) is to have a portion of its exposed interior dough D removed. Once more, it is preferable to do so effectively, conveniently and inexpensively without requiring the user to pull or touch any of the interior dough D with his or her fingers F. Such bagel half B may be placed on a flat surface for support and steadied there by one of the user's hands or may be held in one of the user's hands. The bagel dough removal tongs 30 are then held in the user's other or free hand. While initially maintaining a relaxed grip on the opposite tong members 40, 70 so that the spring 100 biases the members 40, 70 outwardly toward the first or at rest configuration of the tongs 30, such that the distal first and second ends 48, 78, and particularly the first and second leading edges 56, 86, are substantially at their widest position correlating to opening 36, the tongs 30 are then brought into contact with and pushed into the bagel dough D substantially between the perimeter P and core E of the crust C so as to span a relatively wide swath of dough D. In such location and with further manipulation of the tongs 30 as needed, the leading edges 56, 86 are pushed further into dough D until they are substantially adjacent to the inside surfaces of the crust C. In such position of the tongs 30, and again with further manipulation as needed relative to the bagel half B or otherwise, the tongs 30 and particularly the opposite first and second tong members 40, 70 are squeezed toward one another so as to grasp, tear or otherwise separate a portion of dough D from the bagel half B and trap such dough D between the opposite ends 48, 78, specifically the opposite, inwardly-facing surfaces 54, 84 thereof.

Accordingly, while maintaining inward pressure on the opposite tong members 40, 70 to maintain a grip on the trapped dough D, manipulation of the tongs 30 away from the bagel half B thus results in removal of a portion of the dough D therefrom, which may be released and discarded by simply releasing compression or inward pressure on the tong members 40, 70 to allow the dough D to fall free as the tong members 40, 70, and particularly the distal ends 48, 78, shift away from one another under the biasing effect of the spring 100. This process is simply then repeated until all of the desired dough D is removed from the bagel half B. Those skilled in the art will appreciate that such process as enabled by the bagel dough removal tongs 30 according to aspects of the present invention is highly effective and easy in removing unwanted bagel dough D yet is accomplished by a relatively simple and inexpensive tong device 30 comprising manually manipulable opposed grasping surfaces. Moreover, by having opposing members as herein described there is no need for one to get his or her thumb T or fingers F into the bagel dough D, rendering the process relatively sanitary as well.

Aspects of the present specification may also be described as follows:

1. Bagel dough removal tongs for removing bagel dough from a substantially half-toroid-shaped bagel half having a crust with an outer perimeter and a central core and further having a nominal bagel width radially spanning the distance across the crust from the perimeter to the core, a nominal bagel height vertically within the bagel dough as half the bagel width, and a nominal bagel chord across the bagel dough within the crust offset from the core and substantially transverse to the bagel width, the tongs comprising: a first tong member having a first leg terminating distally in a first end; a second tong member having a second leg terminating distally in a second end, the first and second legs being joined at a proximal hinge opposite the distal first and second ends, the hinge being configured to bias the first and second legs outwardly in an at rest configuration of the tongs wherein the first and second ends are spaced apart and to selectively allow flexing of the first and second legs inwardly in an operative configuration of the tongs wherein the first and second ends are shifted closer together; further wherein: a first end width and a second end width of the respective first and second ends are in the range of one to two-and-a-half inches for substantially conforming to the nominal bagel width, the bagel dough to be removed being located within the crust between the perimeter and the core; and a transverse opening of the tongs in the at rest configuration between first and second leading edges of the respective first and second ends is in the range of one-and-a-half to four-and-a-half inches for substantially conforming to and being interiorly offset from the nominal bagel chord, whereby selectively positioning the tongs while substantially in the at rest configuration such that the first and second ends are adjacent to the crust so as to not span the core therebetween and so positioned substantially along a selected nominal bagel chord and such that the first and second leading edges are pushed into the bagel dough without penetrating the crust and then selectively squeezing inwardly on the first and second tong members so as to shift the first and second legs and first and second ends inwardly toward each other substantially in the operative configuration causes a portion of the bagel dough to be trapped between the first and second ends, such that subsequently pulling the tongs away from the bagel half while still in the operative configuration removes the portion of bagel dough therefrom.

2. The tongs of embodiment 1 wherein the first end width and the second end width are more preferably in the range of one-and-a-quarter to two-and-a-quarter inches and most preferably in the range of one-and-a-half to two inches.

3. The tongs of embodiment 1 or embodiment 2 wherein the transverse opening is more preferably in the range of one-and-three-quarter to three-and-a-half inches and most preferably in the range of two to three inches.

4. The tongs of any of embodiments 1-3 wherein at least one of the first and second ends is formed having distally-projecting teeth.

5. The tongs of embodiment 4 wherein the teeth are formed at the first leading edge of the first end.

6. The tongs of embodiment 4 or embodiment 5 wherein the teeth are formed at the second leading edge of the second end.

7. The tongs of any of embodiments 1-6 wherein at least one of the first and second ends is formed having at least one inwardly-opening recess.

8. The tongs of embodiment 7 wherein an inwardly-opening first recess is formed in a first end inner surface of the first end.

9. The tongs of embodiment 7 or embodiment 8 wherein an inwardly-opening second recess is formed in a second end inner surface of the second end.

10. The tongs of any of embodiments 1-9 wherein an overall length of the tongs from the proximal hinge to distal first and second leading edges of the respective first and second ends is in the range of four to eight inches.

11. The tongs of any of embodiments 1-10 wherein a transition from the respective first and second legs to the respective first and second ends is substantially midway along the overall length.

12. The tongs of any of embodiments 1-11 wherein first and second leg lengths of the respective first and second legs and first and second end lengths of the respective first and second ends are in the range of two to four inches.

13. The tongs of any of embodiments 1-12 wherein a transition from the respective first and second legs to the respective first and second ends of the respective first and second tong members define bends wherein the first and second legs are angularly diverging and the first and second ends are angularly converging in the at rest configuration of the tongs, whereby the first and second ends and particularly the distal first and second leading edges are angled inwardly to aid in operation and the bends at the transition points between the respective first and second legs and the respective first and second ends define an overall width of the tongs that is larger than the transverse opening between the first and second ends in the at rest configuration of the tongs.

14. The tongs of any of embodiments 1-13 wherein an included angle between the first and second legs is in the range of twenty-five to forty-five degrees.

15. A method of removing dough from a half bagel, the method comprising the steps of: maintaining a relaxed grip on opposite first and second tong members of a bagel dough removal tongs so that a spring interconnecting the first and second tong members biases the first and second tong members outwardly toward an at rest configuration of the tongs, whereby distal first and second ends and particularly first and second leading edges thereof are substantially at a widest opening; bringing the first and second ends of the tongs into contact with the dough of the bagel half substantially between a perimeter and a core of a crust of the bagel half so as to span a relatively wide swath of dough along a chord of the bagel half; pushing the first and second leading edges into the dough until the first and second leading edges are substantially adjacent to inside surfaces of the crust; squeezing the tongs and particularly the opposite first and second tong members toward one another so as to grasp a portion of the dough from the bagel half and trap the portion of dough between the opposite first and second ends; and while maintaining inward pressure on the opposite first and second tong members to maintain a grip on the trapped dough, shifting the tongs away from the bagel half, whereby the portion of dough is removed from the bagel half and may be released and discarded by releasing compression on the first and second tong members to allow the dough to fall free as the first and second tong members and particularly the distal first and second ends shift away from one another under the biasing effect of the spring, which process may be repeated until all of the desired dough is removed from the bagel half.

16. The method of embodiment 15, wherein the steps of pushing the first and second leading edges into the dough and squeezing the tongs and particularly the opposite first and second tong members toward one another are facilitated by forming distally-projecting teeth on at least one of the first and second leading edges of the first and second ends.

17. The method of embodiment 15 or embodiment 16 wherein the steps of squeezing the tongs and particularly the opposite first and second tong members toward one another and shifting the tongs away from the bagel half to remove the portion of dough are facilitated by forming at least one inwardly-opening recess in at least one of the first and second ends.

18. The method of any of embodiments 15-17 wherein the step of squeezing the tongs and particularly the opposite first and second tong members toward one another is facilitated by forming a transition from the respective first and second legs to the respective first and second ends of the respective first and second tong members defining a bend wherein the first and second legs are angularly diverging and the first and second ends are angularly converging in the at rest configuration of the tongs, whereby the first and second ends and particularly the distal first and second leading edges are angled inwardly to aid in operation and the bends at the transition points between the respective first and second legs and the respective first and second ends define an overall width of the tongs that is larger than the transverse opening between the first and second ends in the at rest configuration of the tongs so as to provide additional leverage.

In closing, regarding the exemplary embodiments of the present invention as shown and described herein, it will be appreciated that a bagel dough removal tongs apparatus is disclosed and configured for removing dough from the inner portion of a bagel. Because the principles of the invention may be practiced in a number of configurations beyond those shown and described, it is to be understood that the invention is not in any way limited by the exemplary embodiments, but is instead able to take numerous forms without departing from the spirit and scope of the invention. It will also be appreciated by those skilled in the art that the present invention is not limited to the particular geometries and materials of construction disclosed, but may instead entail other functionally comparable structures or materials, now known or later developed, without departing from the spirit and scope of the invention.

Certain embodiments of the present invention are described herein, including the best mode known to the inventor(s) for carrying out the invention. Of course, variations on these described embodiments will become apparent to those of ordinary skill in the art upon reading the foregoing description. The inventor(s) expect skilled artisans to employ such variations as appropriate, and the inventor(s) intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques. Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc.—for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term "comprising" (along with equivalent open-ended transitional phrases thereof such as "including," "containing" and "having") encompasses all the expressly recited elements, limitations, steps and/or features alone or in combination with un-recited subject matter; the named elements, limitations and/or features are essential, but other unnamed elements, limitations and/or features may be added and still form a construct within the scope of the claim. Specific embodiments disclosed herein may be further limited in the claims using the closed-ended transitional phrases "consisting of" or "consisting essentially of" in lieu of or as an amendment for "comprising." When used in the claims, whether as filed or added per amendment, the closed-ended transitional phrase "consisting of" excludes any element, limitation, step, or feature not expressly recited in the claims. The closed-ended transitional phrase "consisting essentially of" limits the scope of a claim to the expressly recited elements, limitations, steps and/or features and any other elements, limitations, steps and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones. The meaning of the closed-ended transitional phrase "consisting of" is being defined as only including those elements, limitations, steps and/or features specifically recited in the claim, whereas the meaning of the closed-ended transitional phrase "consisting essentially of" is being defined as only including those elements, limitations, steps and/or features specifically recited in the claim and those elements, limitations, steps and/or features that do not materially affect the basic and novel characteristic(s) of the claimed subject matter. Therefore, the open-ended transitional phrase "comprising" (along with equivalent open-ended transitional phrases thereof) includes within its meaning, as a limiting case, claimed subject matter specified by the closed-ended transitional phrases "consisting of" or "consisting essentially of." As such, embodiments described herein or so claimed with the phrase "comprising" are expressly or inherently unambiguously described, enabled and supported herein for the phrases "consisting essentially of" and "consisting of."

All patents, patent publications, and other publications referenced and identified in the present specification are individually and expressly incorporated herein by reference in their entirety for the purpose of describing and disclosing, for example, the compositions and methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. Bagel dough removal tongs for removing bagel dough from a substantially half-toroid-shaped bagel half having a crust with an outer perimeter and a central core and further having a nominal bagel width radially spanning the distance across the crust from the perimeter to the core, a nominal bagel height vertically within the bagel dough as half the bagel width, and a nominal bagel chord across the bagel dough within the crust offset from the core and substantially transverse to the bagel width, the tongs comprising:

a first tong member having a first leg terminating distally in a first end; and a second tong member having a second leg terminating distally in a second end, the first and second legs being joined at a proximal hinge opposite the distal first and second ends, the hinge being configured to bias the first and second legs outwardly in an at rest configuration of the tongs wherein the first and second ends are spaced apart and to selectively allow flexing of the first and second legs inwardly in an operative configuration of the tongs wherein the first and second ends are shifted closer together; further wherein:

a first end width and a second end width of the respective first and second ends are in a range of one to two-and-a-half inches for substantially conforming to the nominal bagel width, the bagel dough to be removed being located within the crust between the perimeter and the core;

a transverse opening of the tongs in the at rest configuration between first and second leading edges of the respective first and second ends is in a range of one-and-a-half to four-and-a-half inches for substantially conforming to and being interiorly offset from the nominal bagel chord, whereby selectively positioning the tongs while substantially in the at rest configuration such that the first and second ends are adjacent to the crust so as to not span the core therebetween and so positioned substantially along a selected nominal bagel chord and such that the first and second leading edges are pushed into the bagel dough without penetrating the crust and then selectively squeezing inwardly on the first and second tong members so as to shift the first and second legs and first and second ends inwardly toward each other substantially in the operative configuration causes a portion of the bagel dough to be trapped between the first and second ends, such that subsequently pulling the tongs away from the bagel half while still in the operative configuration removes the portion of bagel dough therefrom; and a transition from the respective first and second legs to the respective first and second ends of the respective first and second tong members defines bends wherein the first and second legs are angularly diverging and the first and second ends are angularly converging in the at rest configuration of the tongs, whereby the first and second ends and the distal first and second leading edges are angled inwardly to aid in operation and the bends at transition points between the respective first and second legs and the respective first and second ends define an overall width of the tongs that is larger than the transverse opening between the first and second ends in the at rest configuration of the tongs, and wherein an angle between the first and second legs being in a range of twenty-five to forty-five degrees.

2. The tongs of claim 1, wherein the first end width and the second end width are in a range of one-and-a-quarter to two-and-a-quarter inches.

3. The tongs of claim 1, wherein the transverse opening is in a range of one-and-three-quarter to three-and-a-half inches.

4. The tongs of claim 1, wherein at least one of the first and second ends is formed having distally-projecting teeth.

5. The tongs of claim 4, wherein the teeth are formed at the first leading edge of the first end.

6. The tongs of claim 5, wherein the teeth are further formed at the second leading edge of the second end.

7. The tongs of claim 1, wherein at least one of the first and second ends is formed having at least one inwardly-opening recess.

8. The tongs of claim 7, wherein an inwardly-opening first recess is formed in a first end inner surface of the first end.

9. The tongs of claim 8, wherein an inwardly-opening second recess is formed in a second end inner surface of the second end.

10. The tongs of claim 1, wherein an overall length of the tongs from the proximal hinge to distal first and second leading edges of the respective first and second ends is in a range of four to eight inches.

11. The tongs of claim 10, wherein the transition from the respective first and second legs to the respective first and second ends is substantially midway along the overall length.

12. The tongs of claim 11, wherein first and second leg lengths of the respective first and second legs and first and second end lengths of the respective first and second ends are in a range of two to four inches.

13. The tongs of claim 1, wherein the first end width and the second end width are in a range of one-and-a-half to two inches.

14. The tongs of claim 1, wherein the transverse opening is in a range of two to three inches.

15. A method of removing dough from a half bagel having a crust with an outer perimeter and a central core and further having a nominal bagel width radially spanning the distance across the crust from the perimeter to the core, a nominal bagel height vertically within the bagel dough as half the bagel width, and a nominal bagel chord across the bagel dough within the crust offset from the core and substantially transverse to the bagel width, the method comprising the steps of:

maintaining a relaxed grip on opposite first and second tong members of a bagel dough removal tongs so that a spring interconnecting the first and second tong members biases the first and second tong members outwardly toward an at rest configuration of the tongs, whereby distal first and second ends and particularly first and second leading edges thereof are substantially at a widest opening; the first tong member having a first leg terminating distally in the first end and the second tong member having a second leg terminating distally in the second end, further wherein:

a first end width and a second end width of the respective first and second ends are in a range of one to two-and-a-half inches for substantially conforming to the nominal bagel width, the bagel dough to be removed being located within the crust between the perimeter and the core;

a transverse opening of the tongs in the at rest configuration between first and second leading edges of the respective first and second ends is a the range of one-and-a-half to four-and-a-half inches for substantially conforming to and being interiorly offset from the nominal bagel chord, whereby selectively positioning the tongs while substantially in the at rest configuration such that the first and second ends are adjacent to the crust so as to not span the core therebetween and so positioned substantially along a selected nominal bagel chord and such that the first and second leading edges are pushed into the bagel dough without penetrating the crust and then selectively squeezing inwardly on the first and second tong members so as to shift the first and second legs and first and second ends inwardly toward each other substantially in the operative configuration causes a portion of the bagel dough to be trapped between the first and second ends, such that subsequently pulling the tongs away from the bagel half while still in the operative configuration removes the portion of bagel dough therefrom; and a transition from the respective first and second legs to the respective first and second ends of the respective first and second tong members defines bends wherein the first and second legs are angularly diverging and the first and second ends are angularly converging in the at rest configuration of the tongs, whereby the first and second ends and the distal first and second leading edges are angled inwardly to aid in operation and the bends at transition points between the respective first and second legs and the respective first and second ends define an overall width of the tongs that is larger than the transverse opening between the first and second ends in the at rest configuration of the tongs so as to provide additional leverage, wherein an angle between the first and second legs being in a range of twenty-five to forty-five degrees; and wherein:

bringing the first and second ends of the tongs into contact with the dough of the bagel half substantially between a perimeter and a core of a crust of the bagel half so as to span a relatively wide swath of dough along a chord of the bagel half;

pushing the first and second leading edges into the dough until the first and second leading edges are substantially adjacent to inside surfaces of the crust;

squeezing the tongs and particularly the opposite first and second tong members toward one another so as to grasp a portion of the dough from the bagel half and trap the portion of dough between the opposite first and second ends; and while maintaining inward pressure on the opposite first and second tong members to maintain a grip on the trapped dough, shifting the tongs away from the bagel half, whereby the portion of dough is removed from the bagel half and may be released and discarded by releasing compression on the first and second tong members to allow the dough to fall free as the first and second tong members and particularly the distal first and second ends shift away from one another under the biasing effect of the spring, which process may be repeated until all of the desired dough is removed from the bagel half.

16. The method of claim 15, wherein the steps of pushing the first and second leading edges into the dough and squeezing the tongs and the opposite first and second tong members toward one another are facilitated by forming distally-projecting teeth on at least one of the first and second leading edges of the first and second ends.

17. The method of claim 15 wherein the steps of squeezing the tongs and particularly the opposite first and second tong members toward one another and shifting the tongs away from the bagel half to remove the portion of dough are facilitated by forming at least one inwardly-opening recess in at least one of the first and second ends.

18. Bagel dough removal tongs comprising:
a first tong member having a first leg terminating distally in a first end; and
a second tong member having a second leg terminating distally in a second end, the first and second legs being joined at a proximal hinge opposite the distal first and second ends, the hinge being configured to bias the first and second legs outwardly in an at rest configuration of the tongs wherein the first and second ends are spaced apart and to selectively allow flexing of the first and second legs inwardly in an operative configuration of the tongs wherein the first and second ends are shifted closer together; further wherein:
a first end width and a second end width of the respective first and second ends are in a range of one to two-and-a-half inches;
a transverse opening of the tongs in the at rest configuration between first and second leading edges of the respective first and second ends is in a range of one-and-a-half to four-and-a-half inches; and
a transition from the respective first and second legs to the respective first and second ends of the respective first and second tong members defines bends wherein the first and second legs are angularly diverging and the first and second ends are angularly converging in the at rest configuration of the tongs, whereby the first and second ends and the distal first and second leading edges are angled inwardly to aid in operation and the bends at transition points between the respective first and second legs and the respective first and second ends define an overall width of the tongs that is larger than the transverse opening between the first and second ends in the at rest configuration of the tongs, and wherein an angle between the first and second legs being in a range of twenty-five to forty-five degrees.

* * * * *